United States Patent

Cashman, Jr.

[15] 3,673,570

[45] June 27, 1972

[54] COMBINATION EMITTER FOLLOWER DIGITAL LINE DRIVER/SENSOR

[72] Inventor: Harland J. Cashman, Jr., Neptune, N.J.

[73] Assignee: The United States of America as represented by the Secretary of the Army

[22] Filed: Sept. 11, 1969

[21] Appl. No.: 857,103

[52] U.S. Cl. ....................340/147, 178/3, 178/4.1

[51] Int. Cl. ....................H04q 11/00

[58] Field of Search ....................178/3, 4.1; 340/147

[56] References Cited

UNITED STATES PATENTS

| | | | |
|---|---|---|---|
| 2,742,526 | 4/1956 | Ridings | 178/4.1 |
| 3,245,043 | 4/1966 | Gaffney | 178/4.1 X |
| 3,264,406 | 8/1966 | Cohen | 178/4.1 |
| 3,419,671 | 12/1968 | Derenski | 178/3 |
| 3,435,129 | 3/1969 | Rodner | 178/3 |
| 3,529,076 | 9/1970 | Sobotta | 178/3 X |
| 2,738,376 | 3/1956 | Vernam | 178/4.1 |
| 3,245,038 | 4/1966 | Stafford | 178/4.1 X |
| 3,288,919 | 11/1966 | Abbott | 178/3 |
| 3,404,219 | 10/1968 | Couturier | 178/4.1 |
| 3,529,077 | 9/1970 | Peitz | 178/3 |

*Primary Examiner*—Harold I. Pitts
*Attorney*—Harry M. Saragovitz, Edward J. Kelly, Herbert Berl and Jeremiah G. Murray

[57] ABSTRACT

A combined digital line driver and sensor for both transmitting and receiving digital control signals between a plurality of stations over a single conductor. Each station includes an emitter follower which acts as a fraction of an OR gate for driving the digital control signal over the transmission line. The transmission line is connected to one input of a two-diode AND gate. The other input to the AND gate is connected to the input of the emitter follower via an inverter amplifier. The output of the AND gate will contain the received control signal transmitted from some other station unless the associated station is also transmitting a control signal.

2 Claims, 2 Drawing Figures

INVENTOR.
HARLAND J. CASHMAN Jr.

BY: AGENT
Harry M. Saragovitz, Edward J. Kelly &
Herbert Berl ATTORNEYS.

COMBINATION EMITTER FOLLOWER DIGITAL LINE DRIVER/SENSOR

The invention described herein may be manufactured, used, and licensed by or for the Government for governmental purposes without the payment to me of any royalty thereon.

The present invention relates to digital interface equipment and more particularly to a combined digital line driver and sensor.

In the field of digital communications and digital information processing, it has been the general practice to employ separate line driver and sensor circuits, each having separate line interconnections, for transmitting digital control signals between the various components or stations. For example, the various stages of a digital computer are usually interconnected by lines over which control signals are transmitted. A control signal generated in one stage, to possibly indicate a malfunction or an end of cycle in that stage, may be transmitted over a line by a driver to a line sensor in a second stage. Likewise, a second line may be connected between these stages so that a similar signal may be transmitted from the second stage to the first stage when a malfunction is present in the second stage. One of the most critical problems confronting designers of such digital equipment is the reduction in the number of line interconnections between the various stages. However, equally important is the problem of generalizing and simplifying the interconnection equipment, such that all stages may be arbitrarily interconnected with a common cable. Finally, it is also desirable that such signalling equipment be capable of sending signals to an arbitrary number of devices without modification. The present invention overcomes these problems.

The general purpose of this invention is to combine the line driver and sensor for a particular control signal into a single interface device which requires only one transmission line between devices over which the particular control signal is both transmitted and received. To attain this, the present invention contemplates a unique interface device employing an extremely simple digital logic circuit having only a single terminal which may be directly connected to similar interface devices over a single transmission line.

The exact nature of this invention as well as other objects and advantages thereof will be readily apparent from consideration of the following specification relating to the annexed drawing in which.

Figure 1:
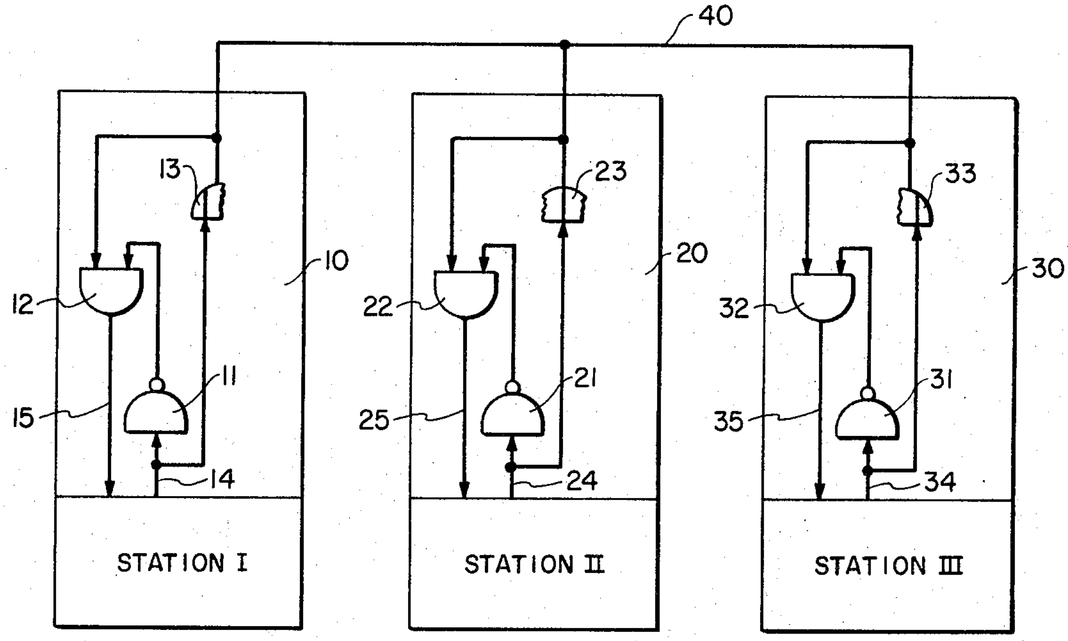
FIG. 1 shows a logic diagram of a preferred embodiment of the invention.

Referring now to the drawing, there is shown in FIG. 1 three stations I, II, and III haVing interface devices 10, 20, and 30 respectively interconnected by a single transmission line 40, over which a digital control signal is to be transmitted from any one station to the others. Therefore, each interface device 10, 20, and 30 contains a combined driver and sensor for a digital control signal which is to be generated in any one of the stations I, II, and III for transmission to the others. Of course, each of the stations I, II, and III may or may not be communicating with each other over additional lines (not shown).

Interface device 10 includes an inverter 11, an AND gate 12, and one-third of an OR gate 13. Devices 20 and 30, which are identical to device 10 includes inverters 21 and 31, AND gates 22 and 32, and the one-third OR gates 23 and 33. The combination of gates 13, 23 and 33 together constitute a complete OR gate.

The operation of the interface devices 10, 20, and 30 will now be described. First, let it be assumed that a control signal is generated at each station when, for example, a malfunction occurs at that station, and that it is desired to transmit this signal to each of the other stations to inform the stations that a malfunction exists.

More specifically, station I will generate a control signal internally in some standard fashion and apply it to the line 14, which in turn applies the signal to the input of inverter 11 and the OR gate 13. The output of OR gate 13 is connected to line 40 which transmits the signal to one of the inputs of each AND gate 12, 22, and 32. The other input to each of the AND gates 12, 22, and 32 is connected to the outputs of inverters 11, 21, and 31 respectively. Therefore, the presence of a signal on outputs 25, and 35 will inform the stations II and III respectively that there is a malfunction present at one of the other stations. This received signal may now be used to shut down stations II and III and to also inform stations II and III that the shut down is a result of a malfunction at another station. Of course, output line 15 will not receive the signal on line 40 since the output of inverter 11 will inhibit AND gate 12. The malfunction in station I may now be corrected after which the control signal will be removed from line 14, and operation may continue. Since all of the interface devices 10, 20 and 30 are identical, control signals generated in stations II or III will be transmitted in a similar manner to the other stations.

It is to be noted that if two stations should be transmitting control signals on the line 40 simultaneously only the third station will receive the control signals while the other two stations will not. For example, if stations I and II should simultaneously apply signals to lines 14 and 24 respectively, only line 35 will receive a signal while lines 15 and 25 will not.

Figure 2:
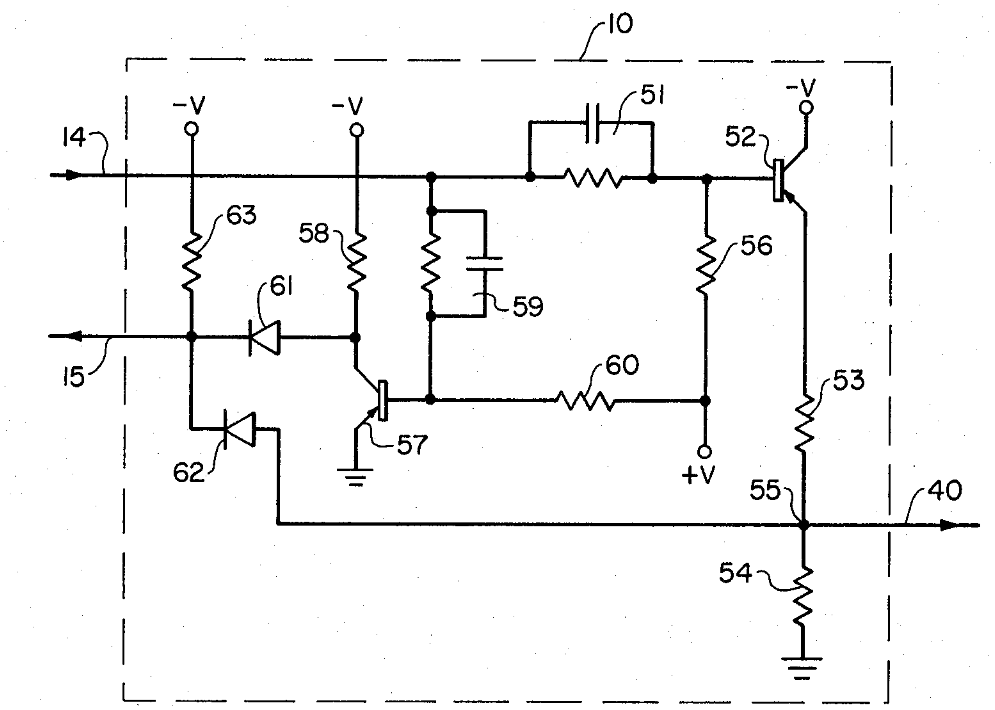
FIG. 2 shows a circuit diagram of the device shown in FIG. 1.

Implementation of the interface devices 10, 20 and 30 will be identical. FIG. 2 shows interface device 10 with lines 14 and 15 at one side thereof and line 40 at the other. Line 14 is connected to the base of a PNP transistor 52 via an R-C circuit 41. A negative voltage −V, which is considered to be a logical "1", is connected to the collector of transistor 52 and the emitter is grounded through a voltage divider containing series resistors 53 and 54. The transmission line 40 is connected to the junction 55. A positive voltage +V is connected via biasing resistor 56 to the base of transistor 52. The transistor 52 is connected as an emitter follower and a signal on line 14 will appear power amplified at terminal 55. Therefore, transistor 52 and the associated elements 51, 56, 53, and 54 constitute the one-third OR circuit 13 of FIG. 1. The inverter 11 of FIG. 1 is implemented in FIG. 2 by the PNP transistor 57, the emitter being grounded, the collector being connected to −V through resistor 58, and the base being connected to line 14 through R-C circuit 59. The base of transistor 57 is also connected through bias resistor 60 to +V. Signals applied to line 14 will, therefore, appear inverted at the collector of transistor 57. Also, in accordance with the structure of FIG. 1, the output of transistor 57 and the line 40 are connected to the inputs of a two input AND gate 12 which is implemented in FIG. 2 as a pair of diodes 61 and 62 having their cathodes connected in common to line 15 and to −V via bias resistor 63. The anodes of diodes 61 and 62 are connected to the collector of transistor 57 and the terminal 55 respectively. Therefore, the voltage on line 15 will remain at 0 volts or ground (a logical "0") unless both the collector of transistor 57 and the terminal 55 are both at −V (logical "1"). This condition exists when transistor 57 is turned off by line 14 via bias 59, and terminal 55 is at −V due to a signal on line 40 from some other station. The operation of transistor 52 in conjunction with similar transistors at the other stations may be visualized by observing that a negative voltage on line 14 (or line 24 or line 34) will turn on the transistor 52 (or a comparable transistor at the other stations), thereby causing a current to flow from ground through resistors 53 and 54 to −V. It is assumed that substantially all of the voltage drop appears across resistor 54.

Obviously many modifications and variations of the present invention are possible in the light of the above teachings.

What is claimed is:

1. A combination line driver and sensor comprising an input line; an output line; a transmission line; an emitter follower means, having an input terminal and an output terminal, for driving signals from said input terminal to said output terminal; said input line connected to said input terminal; said output terminal connected to said transmission line; an inverter means; said input line connected to said inverter means for inverting the signal thereon; an AND gate having a first input connected to the output of said inverter means and a second input connected to said transmission line; and said output line being connected to the output of said AND gate.

2. A communication system comprising a plurality of stations; a transmission line; each said station including an interface means for selectively driving and sensing signals on said transmission line; each said interface means including an input line; an output line; a buffer means for driving signals from said input line onto said transmission line; said buffer means including an emitter follower means; the output of each said emitter follower means at each said station being connected to said transmission line; the input of said emitter follower means being connected to said input line for providing a signal on said transmission line when a signal appears on any one of said input lines at any one of said stations; a gating means connected between said transmission line and said output line for sensing signals on said transmission line; and means connected between said input line and said gating means for closing said gate in response to a signal on said input line.

* * * * *